United States Patent Office 3,558,291
Patented Jan. 26, 1971

3,558,291
JET FUEL ADDITIVE
Richard G. Abowd, Jr., Farmington, Mich., assignor to Ethyl Corporation, New York, N.Y., a corporation of Virginia
No Drawing. Filed Dec. 20, 1968, Ser. No. 785,799
Int. Cl. C10l 1/30
U.S. Cl. 44—68                                      11 Claims

ABSTRACT OF THE DISCLOSURE

A method of reducing manganese containing deposits formed on the surfaces of jet engines from burning fuel containing organomanganese compound as a smoke reducer is described. The deposits are reduced by adding an antimony compound to the organomanganese containing fuel.

---

Cyclopentadienyl manganese tricarbonyl compounds are useful organomanganese compounds; antimony alkyl dithiocarbamate are useful antimony compounds.

BACKGROUND OF THE INVENTION

Smoke produced during the operation of a distillate fuel burning engine, such as a jet engine, is undesirable. It contributes to air pollution. It indicates reduced engine efficiency.

This exhaust smoke may be reduced by adding suitable additives to the fuel. Especially effective additives are certain cyclopentadienyl manganese tricarbonyls, such as (methylcyclopentadienyl)manganese tricarbonyl. U.S. 2,818,417 provides a thorough list of useful compounds of this type, and includes methods of preparing them. Although use of these manganese additives substantially reduces the exhaust smoke, a secondary problem may arise in some instances. On combustion of the fuel containing the manganese compound, manganese containing depositions are formed on the engine surface which are contacted by the exhaust products. As with many engine deposits, an effective method of reducing these manganese containing deposits is desirable.

SUMMARY OF THE INVENTION

A method of reducing manganese containing deposits formed on the surfaces of jet engines which burn fuel containing organomanganese compounds, which comprises adding to said fuel prior to burning, a deposit reducing amount of an antimony carbamate in an amount sufficient to reduce the amount of said manganese containing deposit.

DESCRIPTION OF PREFERRED EMBODIMENT

An embodiment of this invention is a method of reducing manganese containing deposits formed on the surface of a jet engine from burning a fuel containing a smoke reducing quantity of a cyclopentadieneyl manganese tricarbonyl, wherein the cyclopentadienyl radical has up to 17 carbon atoms; which comprises adding to said fuel prior to burning, a deposit reducing amount of an antimoy compound having the formula $$Sb(R)_x \quad (I)$$

wherein $x$ is selected from the integers 3 and 5 and R is selected from

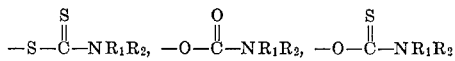

and

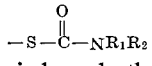

wherein $R_1$ and $R_2$ are independently selected from hydrogen and $C_6$–$C_{18}$ aryl groups, $C_1$–$C_{18}$ hydrocarbon alkyl groups, and burning the fuel in said engine. Fuel compositions which are used in the preferred method contain 0.025 to about 6.45 grams of manganese per gallon as a cyclopentadienyl manganese tricarbonyl and sufficient antimony compound of Formula I so that the atomic ratio of manganese (Mn):antimony (Sb) is from about 0.5:1 to about 4:1. A ratio of Mn:Sb of about 1:1 to about 2:1 is preferred. Antimony dithiocarbamates and (methylcyclopentadienyl)manganese tricarbonyl in the preferred ratio in the fuel is a most preferred embodiment.

Manganese compounds which are useful as smoke reducers in jet fuels are cyclopentadienyl manganese tricarbonyls having the formula $$RMn(CO)_3$$

wherein R is a cyclopentadienyl hydrocarbon radical having from 5 to 17 carbon atoms. U.S. 2,818,417, issued Dec. 31, 1957, contains an extensive disclosure of the type of manganese compounds which are useful. This listing of compounds is incorporated by reference.

(Methylcyclopentadienyl)manganese tricarbonyl is an especially effective smoke reducer.

The concentration of the manganese tricarbonyl in the jet fuels may be varied. Concentrations from 0.025 to about 6.45 grams of manganese per gallon as a cyclopentadienyl manganese tricarbonyl are useful.

By jet fuels, we include distillate hydrocarbons and blends which are useful as fuel for jet engines. These fuels are principally hydrocarbon distillates heavier than gasoline. In other words, they are distillate hydrocarbon fuels having a higher end point than gasoline. They are generally composed of distillate fuels and naphthas and blends of the above, including blends with lighter hydrocarbon fractions. The end point of preferable jet fuels is at least 435° F. and more preferably greater than 470° F.

Typical jet fuels include JP-3, a mixture of about 70 percent gasoline and 30 percent light distillate having a 90 percent evaporation point of 470° F.; JP-4, a mixture of about 65 percent gasoline and 35 percent light distillate especially designed for high altitude performance; JP-5, an especially fractionated kerosene and the like.

Antimony compounds which are useful in the present invention are those represented by Formula I. These compounds may be oil dispersible or oil soluble. By oil soluble is meant solubility in jet fuels in an amount sufficient to effect manganese deposit reduction as described herein. Oil soluble compounds are preferred. The antimony include carbamates, thiocarbamates and dithiocarbamates. Antimony carbamates are represented by the formula

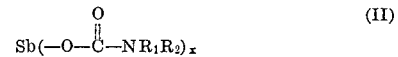

wherein $x$, $R_1$ and $R_2$ have the same significance as in Formula I. Examples of useful carbamates of Formula II are antimony carbamate, antimony dimethylcarbamate, antimony diphenylcarbamate, antimony didodecylcarbamate, antimony methylcarbamate, antimony p-dodecylphenylcarbamate, antimony tolylcarbamate, antimony nitrophenylcarbamate, and the like.

Antimony thiocarbamates are represented by the formulae

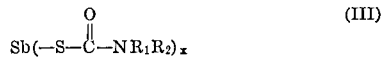

(III)

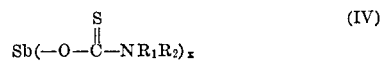

(IV)

wherein $x$, $R_1$ and $R_2$ have the same significance as in Formula I. Examples of useful thiocarbamates of Formulae III and IV are antimony thiocarbamate, antimony ethylthiocarbamate, antimony - α - naphthylthiocarbamate, antimony methylphenylthiocarbamate, antimony di-tert-butylthiocarbamate, antimony xylylthiocarbamate, antimony 2 - nonylphenylthiocarbamate, antimony 2-nitrophenylthiocarbamate, antimony diphenylthiocarbamate, antimony dodecylthiocarbamate, antimony diisopropylthiocarbamate, antimony hexyl - o - cresylthiocarbamate, antimony 4 - aminophenylthiocarbamate, and the like.

Antimony dithiocarbamates are represented by the formula

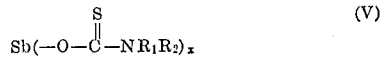

(V)

wherein $x$, $R_1$ and $R_2$ have the same significance as above.

The dithiocarbamates are especially preferred antimony compounds. Examples of useful dithiocarbamates of Formula V are antimony butyldithiocarbamate, antimony diamyldithiocarbamate, antimony phenyldithiocarbamate, antimony methylxylyldithiocarbamate, antimony undecyldithiocarbamate, antimony didodecyldithiocarbamate, antimony di - p - tolyldithiocarbamate, antimony o-nitrophenyldithiocarbamate, antimony o-bromophenyldithiocarbamate, antimony p-hydroxyphenyldithiocarbamate, antimony diindenyldithiocarbamate, antimony 4-dodecylphenyldithiocarbamate, antimony di(2,6 - di - tert-butylphenyldithiocarbamate, antimony octadecyldithiocarbamate, and the like.

Antimony $C_1$-$C_{18}$ alkyldithiocarbamates, and mixtures thereof, wherein antimony has a valence of 3, are most preferred additives. Examples of these compounds are

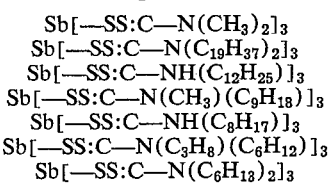

and the like.

The amount of the antimony compounds described above which is added to the organomanganese containing fuel may be varied. In general, sufficient antimony compound is added to the fuel so that the atomic ratio of manganese (Mn):antimony (Sb) in the fuel is about 0.5:1 to about 1:0.01. It is preferred that the amount of organo phosphorus compound added gives an atomic ratio of Mn:Sb in the fuel of from about 1:1 to about 2:1.

The following examples illustrate but do not limit jet fuel compositions useful in this invention. The antimony (III) dialkyldithiocarbamate of Examples 1–5 is a commercial product, Vanlube 73, which contains 6.6% antimony by weight. The numeral (III) indicates that antimony has a valence of 3 in the compound.

Example 1

To a JP–5 (ASTM-Type 4) base fuel was added 2.58 grams/gallon of Mn as (methylcyclophentadienyl)manganese tricarbonyl and 43.32 grams/gallon of antimony (III) dialkyldithiocarbamate.

The Mn:Sb atomic ratio of this composition is 2:1.

Example 2

To a JP–5 base fuel is added 2.58 grams/gallon of Mn as (methylcyclopentadienyl)manganese tricarbonyl and 86.64 grams/gallon of antimony (III) dialkyldithiocarbamate.

The Mn:Sb atomic ratio of this composition is 1:1.

Example 3

To a JP–5 base fuel are added 1.29 grams/gallon of Mn as (methylcyclopentadienyl)manganese tircarbonyl and 10.83 grams/gallon of antimony (III) dialkyldithiocarbamate.

The Mn:Sb atomic ratio of this composition is 4:1.

Example 4

To a JP–5 base fuel are added 5.16 grams/gallon of Mn as (methylcyclopentadienyl)manganese tricarbonyl and 173.28 grams/gallon of antimony (III) dialkyldithiocarbamate.

The Mn:Sb atomic ratio of this composition is 1:2.

Example 5

To a JP–5 base fuel are added 1.29 grams/gallon of Mn as (methylcyclopentadienyl)manganese tricarbonyl and 173.28 grams/gallon of antimony (III) dialkyldithiocarbamate.

The Mn:Sb atomic ratio of this composition is 1:4.

Useful jet fuel compositions having the deposit reducing characteristics described below are also prepared (a) by using JP–4, JP–3 and the like in place of JP–5 in the above examples, (b) by using equivalent amounts of compounds such as antimony dimethylcarbamate, antimony phenylthiocarbamate, antimony p-dodecylphenyl dithiocarbamate, antimony dixylylcarbamate, antimony undecyldithiocarbamate, antimony 3 - nitrophenyldithiocarbarate, antimony ethylindenyldithiocarbamate, antimony dihexylthiocarbamate, antimony phenylcarbamate and the like in place of the antimony tris (alkylthiocarbamate) in the above examples.

These jet fuel compositions are prepared by simply blending the required amount of manganese-containing smoke reducer and antimony containing deposit reducer with the base jet fuel. Conventional fuel blending apparatus and techniques are used.

When a jet fuel containing an organomanganese compound as a smoke reducer is burned in a jet engine, a manganese containing deposit is formed on parts of the engine which come in contact with the burning fuel and/or its combustion products. Quite unexpectedly, by adding a small amount of an antimony compound of the type described herein to the fuel before burning, the amount of deposit formed is reduced substantially. This deposit reduction improves jet engine life and efficiency.

This unexpected deposit reducing effect was demonstrated by using the following laboratory procedure. This test procedure was designed to simulate jet engine conditions.

A clean metal test specimen was placed in the exhaust opening of a tubular burner fueled with the control fuel, JP–5 containing 2.58 grams/gallon of manganese as (methylcyclopentadienyl)manganese tricarbonyl. The burner was ignited and the test specimen was exposed to the exhaust stream until a certain amount of fuel was burned. The test specimen was then removed from the exhaust stream and weighed. The amount of deposit was obtained by subtracting the weight of the clean metal specimen from the exposed test specimen.

This control test specimen was coated with a light tan colored, dense, hard deposit. Analysis of the deposit showed that it contained manganese oxides primarily.

A second clean test specimen was placed in the exhaust opening of the jet burner, now fueled with the fuel composition of Example 1 (JP–5+Mn compound+antimony compound). The jet burner was ignited and the test piece was exposed to the exhaust stream until an amount of Example 1 fuel equivalent to the control fuel was burned.

The coated test piece was then removed from the exhaust stream and weighed. The deposit weight was obtained by subtracting the clean test piece weight from the coated test piece. The data obtained from these tests is set out below in Table 1.

TABLE 1.—EFFECT OF ANTIMONY COMPOUNDS ON DEPOSITS

| Fuel composition | Amount of deposit formed, mg. |
|---|---|
| Test: | |
| 1 __ JP-5+Mn compound [1] | 82 |
| 2 __ Example 1 | 60 |

[1] (Methylcyclopentadienyl)manganese tri-carbonyl, 2.58 grams/gallon.

The data in Table 1 clearly shows that the addition of a small amount of an antimony (dialkylthiocarbamate) to a manganese containing jet fuel reduces the amount of manganese containing deposit by over 25%. Comparable deposit reduction is obtained from burning other manganese/antimony fuels when compared with fuels containing manganese only.

The method and fuels of the present invention are fully described above. It is intended that this invention be limited only within the spirit and lawful scope of the claims which follow.

I claim:
1. A method of reducing manganese containing deposits formed on the surface of a jet engine from burning a fuel containing a smoke reducing quantity of a cyclopentadienyl manganese tricarbonyl, wherein the cyclopentadienyl radical has up to 17 carbon atoms; which comprises adding to said fuel prior to burning, a deposit reducing amount of an antimony compound

$$Sb(R)_x$$

wherein $x$ is selected from the integers 3 and 5, and R is selected from

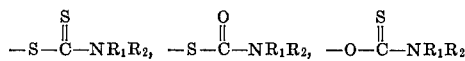

and

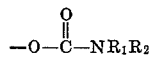

wherein $R_1$ and $R_2$ are independently selected from hydrogen, $C_1$-$C_{18}$ hydrocarbon alkyl radicals and $C_6$-$C_{18}$ aryl radicals, and burning the fuel composition containing cyclopentadienyl manganese tricarbonyl and said antimony compound in said engine.

2. The method of claim 1 wherein the amount of antimony compound present is sufficient to give an atomic ratio of manganese to antimony of from about 4:1 to about 1:4.

3. The method of claim 2 wherein

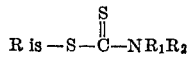

4. The method of claim 3 wherein $R_1$ and $R_2$ are hydrocarbon alkyl groups.

5. The method of claim 4 wherein said cyclopentadienyl manganese tricarbonyl is (methylcyclopentadienyl) manganese tricarbonyl, $x$ is 3 and said atomic ratio is about 2:1.

6. Jet fuel containing a smoke reducing quantity of a cyclopentadienyl manganese tricarbonyl, wherein the cyclopentadienyl radical has up to 17 carbon atoms and a deposit reducing amount of an antimony compound $$Sb(R)_x$$

wherein $x$ is selected from the integers 3 and 5, and R is selected from

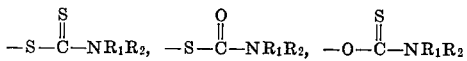

and

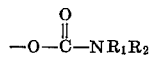

wherein $R_1$ and $R_2$ are independently selected from hydrogen, $C_1$-$C_{18}$ hydrocarbon alkyl radicals and $C_6$-$C_{18}$ aryl radicals.

7. Jet fuel of claim 6 wherein R is the formula

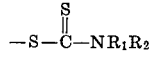

and wherein the amount of said antimony compound is sufficient to give an atomic ratio manganese to antimony of from about 4:1 to about 1:4.

8. Jet fuel of claim 7 wherein $R_1$ and $R_2$ are hydrocarbon alkyl groups.

9. Jet fuel of claim 8 wherein said cyclopentadienyl manganese tricarbonyl is (methyl-cyclopentadienyl) manganese tricarbonyl, $x$ is 3 and said atomic ratio is about 2:1.

10. Jet fuel of claim 6 wherein said cyclopentadienyl manganese tricarbonyl is (methyl-cyclopentadienyl) manganese tricarbonyl.

11. Jet fuel of claim 8 wherein said cyclopentadienyl manganese tricarbonyl is (methyl-cyclopentadienyl) manganese tricarbonyl.

References Cited
UNITED STATES PATENTS

| 3,112,789 | 12/1963 | Percy et al. | 44—68 |
| 3,153,901 | 10/1964 | Rifkin | 44—68 |
| 3,160,592 | 12/1964 | Brown | 44—68 |
| 3,226,427 | 12/1965 | Dunbar | 44—71 |

DANIEL E. WYMAN, Primary Examiner

Y. H. SMITH, Assistant Examiner

U.S. Cl. X.R.
44—71, 72

PO-1050
(5/69)

UNITED STATES PATENT OFFICE
CERTIFICATE OF CORRECTION

Patent No. 3,558,291      Dated January 26, 1971

Inventor(s) Richard G. Abowd, Jr.

It is certified that error appears in the above-identified patent and that said Letters Patent are hereby corrected as shown below:

In Column 1, line 21, "dithiocarbamate" should be -- dithiocarbamates --. In Column 1, lines 60-61, "anti-moy" should be -- antimony --. In Column 3, line 28, that portion of the formula reading "Sb(-O-C" should be -- Sb(-S-C --. In Column 3, line 47, that portion of the formula reading "N($C_{19}H_{37}$)$_2$" should be -- N($C_{18}H_{37}$)$_2$ --. In Column 3, line 72, "(methylcyclophentadienyl)" should be -- (methylcyclopentadienyl) --. In Column 4, line 35, "carbarate" should be -- carbamate --.

Signed and sealed this 4th day of May 1971.

(SEAL)
Attest:

EDWARD M. FLETCHER, JR.
Attesting Officer

WILLIAM E. SCHUYLER,
Commissioner of Patei